(12) United States Patent
Gupta et al.

(10) Patent No.: US 9,626,580 B2
(45) Date of Patent: Apr. 18, 2017

(54) DEFINING REGION FOR MOTION DETECTION

(71) Applicant: Verizon Patent and Licensing Inc., Arlington, VA (US)

(72) Inventors: Nisheeth Gupta, Palo Alto, CA (US); Volodymyr Tymoshchuk, Fremont, CA (US); Erik Villegas, Milpitas, CA (US); Mark A. Stanford, Castro Valley, CA (US); Momin Mirza, Santa Clara, CA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 170 days.

(21) Appl. No.: 14/337,993

(22) Filed: Jul. 22, 2014

(65) Prior Publication Data

US 2016/0026890 A1    Jan. 28, 2016

(51) Int. Cl.
*G06K 9/00* (2006.01)
*G06K 9/46* (2006.01)
*G06T 7/20* (2017.01)

(52) U.S. Cl.
CPC ............... *G06K 9/46* (2013.01); *G06T 7/20* (2013.01); *G06K 2009/4666* (2013.01); *G06T 2207/20021* (2013.01)

(58) Field of Classification Search
CPC ..... G06K 9/00771; G06T 7/20; G06T 7/2006; G06T 2207/20021; G06T 2207/20092; G06T 2207/30232; G08B 13/19602; G08B 13/19606; H04N 5/144
See application file for complete search history.

(56) References Cited

U.S. PATENT DOCUMENTS

| | | | |
|---|---|---|---|
| 2003/0025599 A1* | 2/2003 | Monroe | 340/531 |
| 2004/0246123 A1* | 12/2004 | Kawabe et al. | 340/506 |
| 2008/0079810 A1* | 4/2008 | Fitzgibbon | 348/152 |
| 2009/0278934 A1* | 11/2009 | Ecker et al. | 348/152 |
| 2014/0163703 A1* | 6/2014 | Chang et al. | G05D 27/02 700/90 |
| 2014/0334676 A1* | 11/2014 | Skans et al. | G06K 9/00771 382/103 |

* cited by examiner

*Primary Examiner* — Andrew W Johns

(57) ABSTRACT

A method, performed by a computer device, may include receiving a request to set up motion detection for a camera. The method may include generating a selection grid for a field of view associated with the camera, wherein the selection grid includes a plurality of grid elements; selecting one or more grid elements of the plurality of grid elements; and configuring motion detection for a video feed from the camera based on the selected one or more grid elements.

20 Claims, 10 Drawing Sheets

DEFINING REGION FOR MOTION DETECTION

BACKGROUND INFORMATION

A user may install a home monitoring system that includes one or more security video cameras. The video cameras may be used to monitor the user's home. For example, a security video camera may detect motion and make a video recording of an area in response to the detected motion. The user may be able to play back recorded videos by accessing the security video camera at the user's home. However, configuring a security video camera may be complicated or inconvenient.

DETAILED DESCRIPTION OF PREFERRED EMBODIMENTS

The following detailed description refers to the accompanying drawings. The same reference numbers in different drawings identify the same or similar elements.

A user may set up a camera to monitor a particular area. The user may be interested in detecting movement in the particular area in order to, for example, monitor for intruders or visitors. However, the user may only be interested in detecting movement in a portion of the area, such as in front of a door or along a path. Implementations described herein relate to defining a region for motion detection using a selection grid.

Figure 1:
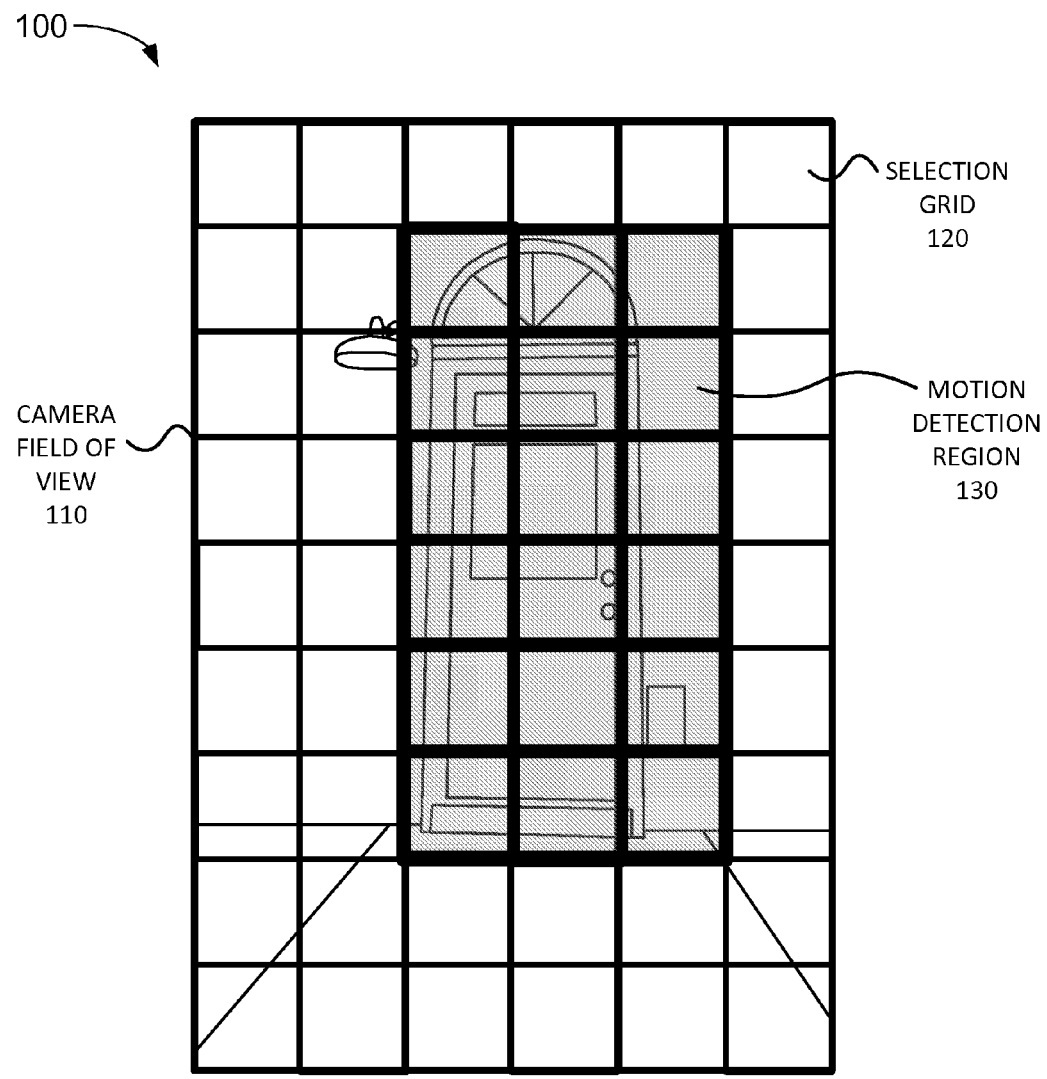
FIG. 1 is a diagram illustrating an overview of a selection grid for configuring motion detection for a camera according to an implementation described herein.

FIG. 1 illustrates a display 100 that includes a camera field of view 110. The user may request to select an area for motion detection. In response, a selection grid 120 may be displayed and superimposed upon the camera field of view 110. Selection grid 120 may include selectable grid elements, such as an array of square or rectangular grid elements. The user may select one or more of the grid elements to define a motion detection region 130. For example, in FIG. 1, the user has selected a region covering a door in the camera field of view 110. Motion detection for the camera may be configured based on the selected grid elements defining motion detection region 130. For example, information identifying motion detection region 130 may be sent to a motion detection system, such as a cloud-based server device, and the motion detection system may generate a mask based on the received information. In some implementations, the camera may be configured to provide the information identifying the selected grid elements defining motion detection region 130 to the motion detection system. In other implementations, another device, such as a device used to set up the camera, may provide the information identifying the selected grid elements defining motion detection region 130 to the motion detection system.

A video feed from the camera may be sent to the motion detection system and the motion detection system may apply the generated mask to the received video feed. If motion is detected in motion detection region 130, the motion detection system may send a notification to a notification device (e.g., the user's mobile phone). For example, the notification may include a snapshot image of the field of view and the user may be able to access a recorded video of the detected motion by clicking on the snapshot image.

Furthermore, when selecting grid elements to define motion detection region 130, the user may change the size of the grid elements of selection grid 120, may change the position of the grid elements of selection grid 120, and/or may select the shape of the grid elements of selection grid 120. Moreover, the user may select a first size, position, and/or shape for the grid elements in a first section of camera field of view 110 and may select a second size, position, and/or shape for the grid elements in a second section of camera field of view 110. Alternatively, the user may not use the grid elements and may use a selection device, such as a cursor or the user's finger, to identify and/or draw a motion detection region.

In some implementations, motion detection region 130 may be selected automatically, without requiring user selection, based on one or more criteria. For example, motion detection region 130 may be selected based on one or more of a detected object in camera field of view 110, a history of detected motion in a particular area of camera field of view 110, an area of focus in camera field of view 110, and/or based on another criterion.

Figure 2:
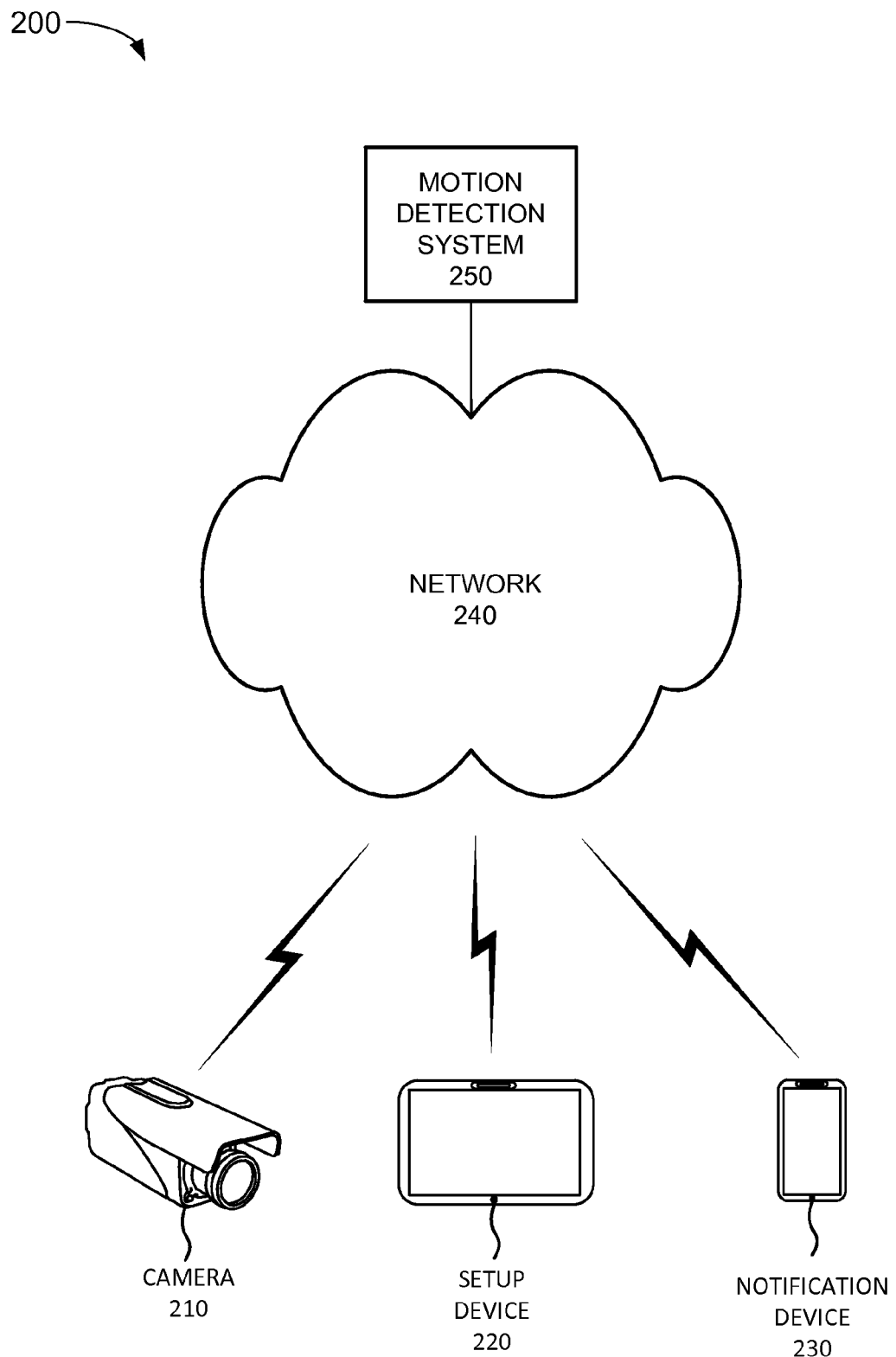
FIG. 2 is a diagram illustrating an environment according to an implementation described herein.

FIG. 2 is a diagram illustrating exemplary components of an environment 200 according to an implementation described herein. As shown in FIG. 2, environment 200 may include a camera 210, a setup device 220, a notification device 230, a network 240, and a motion detection system 250. A user may use setup device 220 to select, using a selection grid, an area in the field of view of camera 210 to which motion detection should be applied. Camera 210 may provide a video feed of the field of view to motion detection system 250. Motion detection system 250 may perform motion detection on the area selected using the selection grid and may send a notification to notification device 230 in response to the detected motion.

Camera 210 may include a camera device configured to capture images and/or a video feed based on a field of view. The field of view may be based on the direction in which one or more sensors of camera 210 are facing. The camera device may include a visible light camera, an infrared light (IR) camera, an ultraviolet (UV) light camera, a depth camera, and/or another type of camera. In some implementations, camera 210 may correspond to a security camera. In other implementations, camera 210 may correspond to a mobile device equipped with a camera, such as a tablet computer, a laptop computer, a mobile phone, a smart phone, a phablet computer device, a wearable computer device (e.g., a glasses smartphone device, a wristwatch smartphone device, etc.), and/or any other type of mobile device that includes a camera device.

Setup device 220 may include a computer device configured to set up motion detection for camera 210. Setup device 220 may include a portable communication device such as a tablet computer, a laptop computer, a mobile phone, a smart phone, a phablet computer device, a wearable computer device (e.g., a glasses smartphone device, a wristwatch smartphone device, etc.), and/or any other type of computer device capable of communicating with camera 210 and/or motion detection system 250.

Notification device 230 may include a computer device configured to receive notifications about detected motion events, based on a video feed from camera 210, from motion detection system 250. Notification device 230 may include a portable communication device such as a tablet computer, a laptop computer, a mobile phone, a smart phone, a phablet computer device, a wearable computer device (e.g., a glasses smartphone device, a wristwatch smartphone device, etc.), and/or any other type of computer device capable of communicating with motion detection system 250.

Camera 210, setup device 220, and notification device 230 may communicate with each other and with network 240 in various ways. As an example, one or more of camera 210, setup device 220, and notification device 230 may communicate with network 240 and/or with each other via a base station (not shown in FIG. 2), such as a Long Term Evolution (LTE) eNodeB base station, a Global System for Mobile Communications (GSM) base station, a Code Division Multiple Access (CDMA) base station, and/or another type of base station. As another example, one or more of camera 210, setup device 220, and/or notification device 230 may communicate with network 240 and/or with each other via a WiFi access point (not shown in FIG. 2) connected to network 240 via a router and/or network terminal (e.g., optical network terminal, cable modem, etc.) using a wired connection. As yet another example, one or more of camera 210, setup device 220, and/or notification device 230 may be connected to a router and/or to network 240 using a wired connection (e.g., Ethernet cable).

Furthermore, while camera 210, setup device 220, and/or notification device 230 are shown in FIG. 2 as separate devices, in other implementations, one or more of camera 210, setup device 220, and/or notification device 230 may correspond to the same device. As an example, setup device 220 and notification device 230 may correspond to a same device. In other words, a user may use the same device to set up camera 210 and to receive notifications about detected motion in the field of view of camera 210. As another example, setup device 220 and camera 210 may correspond to a same device.

Network 240 may include one or more circuit-switched networks and/or packet-switched networks. For example, network 240 may include a local area network (LAN), a wide area network (WAN), a metropolitan area network (MAN), a Public Switched Telephone Network (PSTN), an ad hoc network, an intranet, the Internet, a fiber optic-based network, a wireless network, a satellite network, and/or a combination of these or other types of networks.

Motion detection system 250 may include one or more devices, such as computer devices and/or server devices, which are configured to receive information identifying a selection of one or more grid elements from setup device 220 and/or from camera 210 and to generate a mask based on the received information. Motion detection system 250 may receive a video feed from camera 210 and may apply the generated mask to the received video feed. Motion detection system 250 may then perform a motion detection process on the masked video feed. If motion detection system 250 detects motion in the masked video feed, motion detection system 250 may send a notification to notification device 230.

Although FIG. 2 shows exemplary components of environment 200, in other implementations, environment 200 may include fewer components, different components, differently arranged components, or additional components than depicted in FIG. 2. Additionally or alternatively, one or more components of environment 200 may perform functions described as being performed by one or more other components of environment 200.

Figure 3:
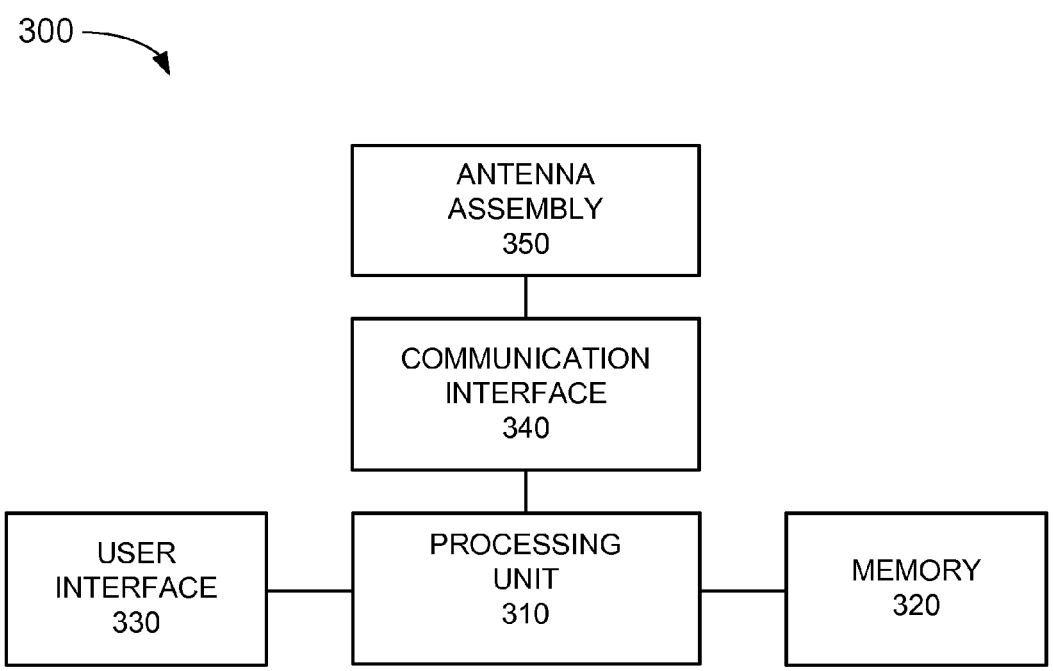
FIG. 3 is a diagram illustrating exemplary components of a device included in FIG. 2.

FIG. 3 is a diagram illustrating exemplary components of device 300 according to an implementation described herein. Camera 210, setup device 220, and/or notification device 230 may each include one or more devices 300. As shown in FIG. 3, device 300 may include a processing unit 310, a memory 320, a user interface 330, a communication interface 340, and an antenna assembly 350.

Processing unit 310 may include one or more processors, microprocessors, application specific integrated circuits (ASICs), field programmable gate arrays (FPGAs), and/or other processing logic. Processing unit 310 may control operation of mobile device 130 and its components.

Memory 320 may include a random access memory (RAM) or another type of dynamic storage device, a read only memory (ROM) or another type of static storage device, a removable memory card, and/or another type of memory to store data and instructions that may be used by processing unit 310.

User interface 330 may allow a user to input information to device 300 and/or to output information from device 300. Examples of user interface 330 may include a speaker to receive electrical signals and output audio signals; a camera to receive image and/or video signals and output electrical signals; a microphone to receive sounds and output electrical signals; buttons (e.g., a joystick, control buttons, a keyboard, or keys of a keypad) and/or a touchscreen to receive control commands; a display, such as a liquid crystal display (LCD), to output visual information; an actuator to cause device 300 to vibrate; a sensor; and/or any other type of input or output device.

Communication interface 340 may include a transceiver that enables device 300 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 340 may include a transmitter that converts baseband signals to radio frequency (RF) signals and/or a receiver that converts RF signals to baseband signals. Communication interface 340 may be coupled to antenna assembly 350 for transmitting and receiving RF signals.

Communication interface 340 may include a logical component that includes input and/or output ports, input and/or output systems, and/or other input and output components that facilitate the transmission of data to other devices. For example, communication interface 340 may include a network interface card (e.g., Ethernet card) for wired communications and/or a wireless network interface (e.g., a WiFi) card for wireless communications. Communication interface 340 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

Antenna assembly 350 may include one or more antennas to transmit and/or receive RF signals. Antenna assembly 350 may, for example, receive RF signals from communication interface 340 and transmit the signals via an antenna and receive RF signals from an antenna and provide them to communication interface 340.

As described herein, device 300 may perform certain operations in response to processing unit 310 executing software instructions contained in a computer-readable medium, such as memory 320. A computer-readable medium may be defined as a non-transitory memory device. A non-transitory memory device may include memory space within a single physical memory device or spread across multiple physical memory devices. The software instructions may be read into memory 320 from another computer-readable medium or from another device via communication interface 340. The software instructions contained in memory 320 may cause processing unit 310 to perform processes that will be described later. Alternatively, hardwired circuitry may be used in place of, or in combination with, software instructions to implement processes described herein. Thus, implementations described herein are not limited to any specific combination of hardware circuitry and software.

Although FIG. 3 shows exemplary components of device 300, in other implementations, device 300 may include fewer components, different components, differently arranged components, or additional components than those depicted in FIG. 3. Additionally or alternatively, one or more components of device 300 may perform the tasks described as being performed by one or more other components of device 300.

Figure 4:
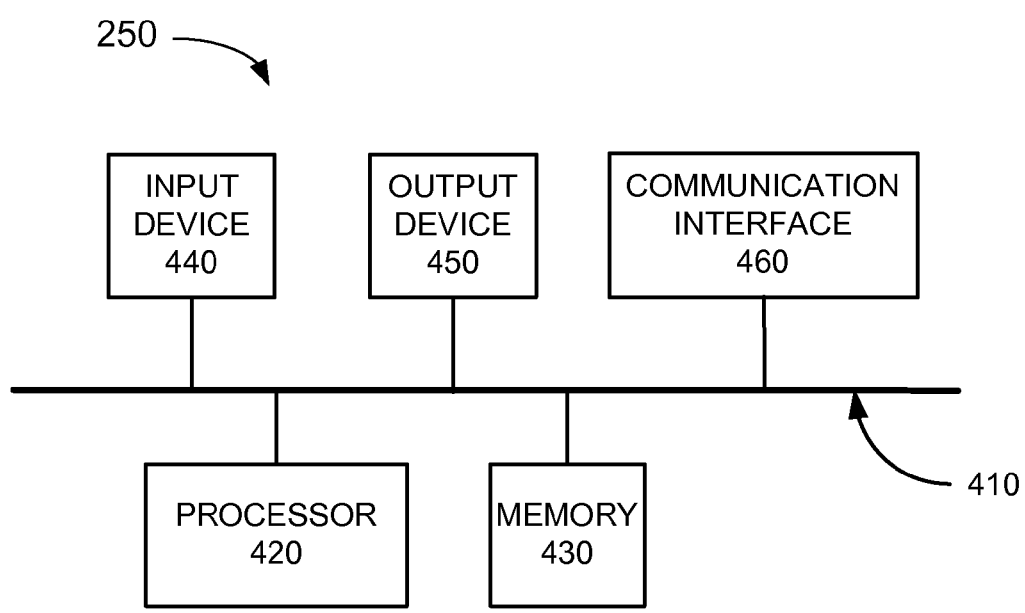
FIG. 4 is a diagram illustrating exemplary components of the motion detection system of FIG. 2.

FIG. 4 is a diagram illustrating exemplary components of motion detection system 250 according to an implementation described herein. As shown in FIG. 4, motion detection system 250 may include a bus 410, a processor 420, a memory 430, an input device 440, an output device 450, and a communication interface 460.

Bus 410 may include a path that permits communication among the components of motion detection system 250. Processor 420 may include any type of single-core processor, multi-core processor, microprocessor, latch-based processor, and/or processing logic (or families of processors, microprocessors, and/or processing logics) that interprets and executes instructions. In other embodiments, processor 420 may include an application-specific integrated circuit (ASIC), a field-programmable gate array (FPGA), and/or another type of integrated circuit or processing logic.

Memory 430 may include any type of dynamic storage device that may store information and/or instructions, for execution by processor 420, and/or any type of non-volatile storage device that may store information for use by processor 420. For example, memory 430 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 440 may allow an operator to input information into motion detection system 250. Input device 440 may include, for example, a keyboard, a mouse, a pen, a microphone, a remote control, an audio capture device, an image and/or video capture device, a touch-screen display, and/or another type of input device. In some embodiments, motion detection system 250 may be managed remotely and may not include input device 440. In other words, motion detection system 250 may be "headless" and may not include a keyboard, for example.

Output device 450 may output information to an operator of motion detection system 250. Output device 450 may include a display, a printer, a speaker, and/or another type of output device. For example, motion detection system 250 may include a display, which may include a liquid-crystal display (LCD) for displaying content to the customer. In some embodiments, motion detection system 250 may be managed remotely and may not include output device 450. In other words, motion detection system 250 may be "headless" and may not include a display, for example.

Communication interface 460 may include a transceiver that enables motion detection system 250 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 460 may include a transmitter that converts baseband signals to radio frequency (RF) signals and/or a receiver that converts RF signals to baseband signals. Communication interface 460 may be coupled to an antenna for transmitting and receiving RF signals.

Communication interface 460 may include a logical component that includes input and/or output ports, input and/or output systems, and/or other input and output components that facilitate the transmission of data to other devices. For example, communication interface 460 may include a network interface card (e.g., Ethernet card) for wired communications and/or a wireless network interface (e.g., a WiFi) card for wireless communications. Communication interface 460 may also include a USB port for communications over a cable, a Bluetooth™ wireless interface, an RFID interface, an NFC wireless interface, and/or any other type of interface that converts data from one form to another form.

As will be described in detail below, motion detection system 250 may perform certain operations relating to motion detection using a mask based on user-selected grid elements. Motion detection system 250 may perform these operations in response to processor 420 executing software instructions contained in a computer-readable medium, such as memory 430. A computer-readable medium may be defined as a non-transitory memory device. A memory device may be implemented within a single physical memory device or spread across multiple physical memory devices. The software instructions may be read into memory 430 from another computer-readable medium or from another device. The software instructions contained in memory 430 may cause processor 420 to perform processes described herein. Alternatively, hardwired circuitry may be used in place of, or in combination with, software instructions to implement processes described herein. Thus, implementations described herein are not limited to any specific combination of hardware circuitry and software.

Although FIG. 4 shows exemplary components of motion detection system 250, in other implementations, motion detection system 250 may include fewer components, different components, additional components, or differently arranged components than those depicted in FIG. 4. Additionally or alternatively, one or more components of motion detection system 250 may perform one or more tasks described as being performed by one or more other components of motion detection system 250.

Figure 5:
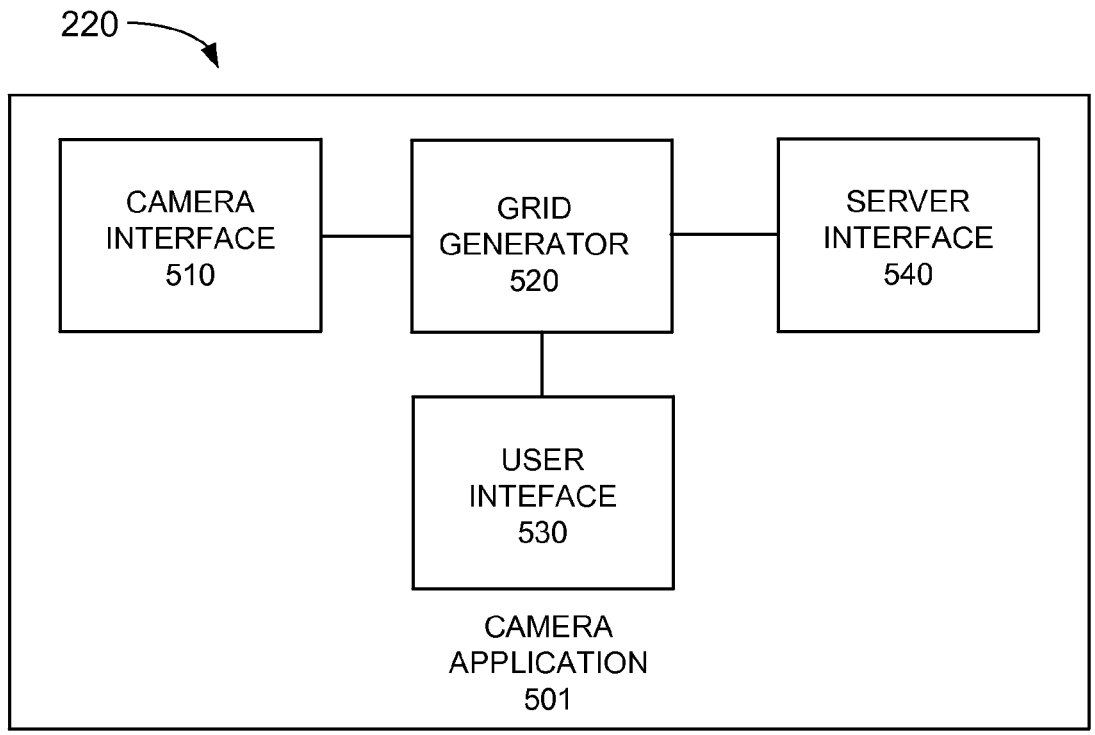
FIG. 5 is a diagram illustrating exemplary functional components of the setup device of FIG. 2.

FIG. 5 is a diagram illustrating exemplary functional components of setup device 220 according to an implementation described herein. The functional components of setup device 220 may be implemented, for example, via processing unit 310 executing instructions from memory 320. Alternatively, some or all of the functional components of setup device 220 may be implemented via hard-wired circuitry. As shown in FIG. 5, setup device 220 may include a camera application 501. Camera application 501 may be installed on setup device 220 in order to configure camera 210. In some implementations, camera application 501 may be obtained from motion detection system 250. In other implementations, camera application 501 may be obtained from camera 210. In yet other implementations, camera application 501 may be hosted by camera 210. In yet other implementations, camera application 501 may be hosted by motion detection system 250 and may be accessed via setup device 220. Camera application 501 may include a camera interface 510, a grid generator 520, a user interface 530, and a server interface 540.

Camera interface 510 may communicate with camera 210. As an example, camera interface 510 may obtain a video feed from camera 210 and may provide the video feed to grid generator 520. As another example, camera interface 510 may provide information identifying selected grid elements, used to define a motion detection area, to camera 210 and may instruct camera 210 to provide the information identifying the selected grid elements to motion detection system 250 along with a video feed.

Grid generator 520 may generate selection grid 120 and may superimpose selection grid 120 over a camera video feed in order to enable a user to select one or more grid elements to define motion detection region 130. Furthermore, grid generator 520 may be configured to enable the user to manipulate selection grid 120 to select the size, position, and/or shape of the grid elements.

User interface 530 may display selection grid 120, superimposed on camera field of view 110, on an output device of setup device 220, such as a touchscreen. Furthermore, user interface 530 may receive input to manipulate selection grid 120 and/or to receive selections of one or more grid elements to define motion detection region 130 via an input device of setup device 220, such as a touchscreen.

Server interface 540 may communicate with motion detection system 250. As an example, in some implementations, server interface 540 may provide information identifying selected grid elements, used to define a motion detection area for a field of view of camera 210, to motion detection system 250. As another example, server interface 540 may provide information identifying a device to which notifications about detected motion for camera 210 should be sent (e.g., notification device 230).

Although FIG. 5 shows exemplary functional components of setup device 220, in other implementations, setup device 220 may include fewer functional components, different functional components, differently arranged functional components, or additional functional components than depicted in FIG. 5. Additionally or alternatively, one or more functional components of setup device 220 may perform functions described as being performed by one or more other functional components of setup device 220.

Figure 6:
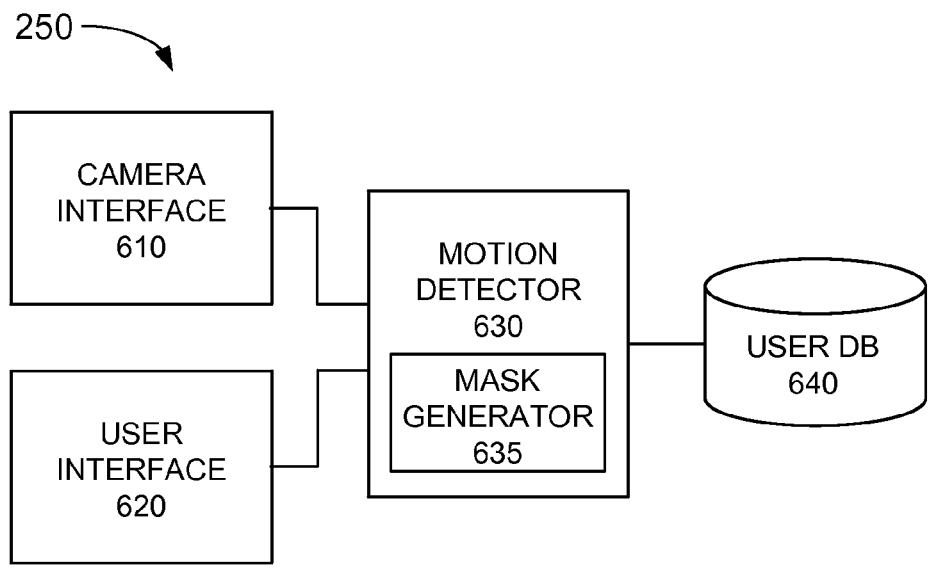
FIG. 6 is a diagram illustrating exemplary functional components of the motion detection system of FIG. 2.

FIG. 6 is a diagram illustrating exemplary functional components of motion detection system 250 according to an implementation described herein. The functional components of motion detection system 250 may be implemented, for example, via processor 420 executing instructions from memory 430. Alternatively, some or all of the functional components of motion detection system 250 may be implemented via hard-wired circuitry. As shown in FIG. 6, motion detection system 250 may include a camera interface 610, a user interface 620, a motion detector 630, and a user database (DB) 640.

Camera interface 610 may receive a video feed from camera 210 and may provide the video feed to motion detector 630. User interface 620 may communicate with user devices, such as setup device 220 and/or notification device 230. As an example, user interface 620 may receive information identifying one or more grid elements to define motion detection region 130 for camera 210 from setup device 220. As another example, user interface 620 may receive information identifying notification device 230, and/or an account associated with notification device 230 (e.g., a telephone number, email address, etc.) from setup device 220. As yet another example, user interface 620 may send a notification, associated with a motion detection event for camera 210, to notification device 230.

Motion detector 630 may perform a motion detection process on a video feed received from camera 210. For example, motion detector 630 may generate a reference image based on the video feed and may compare images included in a received video feed to the reference image to determine how many pixels differ from a particular image in the received video feed to the reference image. The reference image may correspond to an image previously received via the video feed. If the number of pixels between a current image and the reference image is greater than a threshold, a motion detection event may be generated. The comparison of the reference image to a current image may take into account variations in lights, camera flicker, sensor artifacts, environmental effects, ambient movement, and/or other factors in order to reduce the number of false positive motion detection events. In other implementations, motion detector 630 may detect motion using another technique.

Motion detector 630 may include mask generator 635. Mask generator 635 may generate a mask based on information stored in user DB 640. User DB 640 may store information associated with particular users. For example, for a particular user, user DB 640 may store information identifying one or more cameras associated with the particular user. For a particular identified camera, user DB 640 may store information identifying one or more selected grid elements to define motion detection region 130 for the particular identified camera. The selected grid elements may be identified based on coordinates associated with the selected grid elements along with a size, position, and/or shape for the selected grid elements, based on pixel coordinates of pixels associated with the selected grid elements, and/or based on another method of identifying the selected grid elements. Furthermore, user DB 640 may store information identifying a notification device and/or a notification method for sending a notification in response to detecting motion in the video feed received from camera 210. For example, user DB 640 may store a telephone number to which a notification text message should be sent, an email address, an Internet Protocol (IP) address, and/or another type of identifier.

Although FIG. 6 shows exemplary functional components of motion detection system 250, in other implementations, motion detection system 250 may include fewer functional components, different functional components, differently arranged functional components, or additional functional components than depicted in FIG. 6. Additionally or alternatively, one or more functional components of motion detection system 250 may perform functions described as being performed by one or more other functional components of motion detection system 250.

Figure 7:
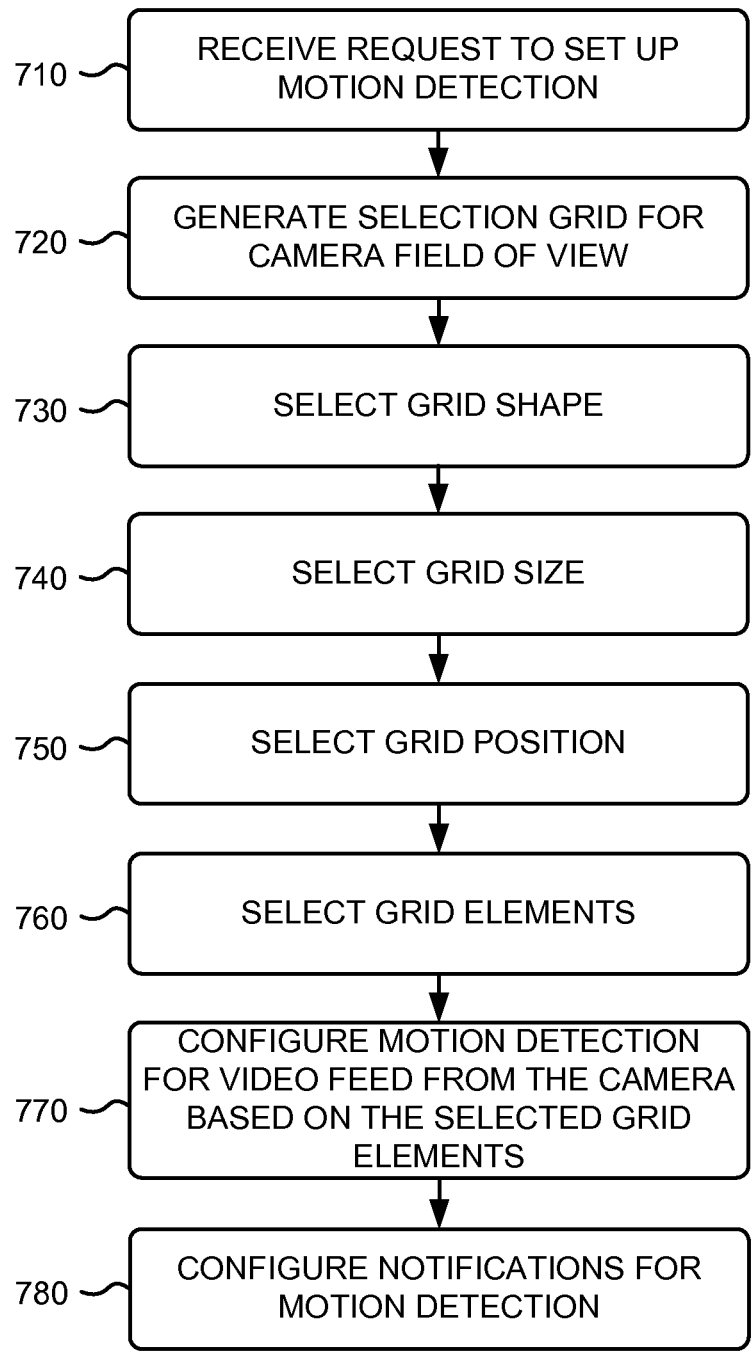
FIG. 7 is a flowchart of a process for setting up a camera for motion detection according to an implementation described herein.

FIG. 7 is a flowchart of a process for setting up a camera for motion detection according to an implementation described herein. In some implementations, the process of FIG. 7 may be performed by setup device 220. In other implementations, some or all of the process of FIG. 7 may be performed by another device or a group of devices separate from or including setup device 220.

The process of FIG. 7 may include receiving a request to set up motion detection (block 710). As an example, a user may activate camera application 501 on setup device 220. As another example, the user may access camera application 501 on motion detection system 250. As yet another example, the user may access camera application 501 at camera 210 via setup device 220.

A selection grid may be generated for a camera field of view (block 720). For example, camera application 501 may receive a video feed from camera 210 that displays a field of view of camera 210 and may display the video feed on an output device of setup device 220 (e.g., on a touchscreen of setup device 220). Camera application 501 may generate selection grid 120 and may superimpose the generated selection grid 120 on the displayed video feed of camera field of view 110. Furthermore, camera application 501 may enable the user to manipulate selection grid 120 to change the size, position, and/or shape of the selection grid elements. In some implementations, camera application 501 may generate a user interface that includes one or more selection elements to enable the user to manipulate selection grid 120. In other implementations, camera application 501 may enable the user to manipulate selection grid 120 using particular gestures made by, for example, the user's finger(s) or a pointing device/cursor.

A grid shape may be selected (block 730). The user may change the shape of the grid elements. For example, a user may select rectangular grid elements for a rectangular or square grid, triangular elements for a triangular grid, pentagonal grid elements for a pentagonal grid, and/or may select another shape for the grid elements of selection grid 120. The user may use a selection grid on a user interface to select a particular shape.

A grid size may be selected (block 740). The user may change the size of the grid elements. As an example, if the grid elements correspond to rectangular elements, the user may use a selection element on a user interface to adjust the height and/or width of the rectangular grid elements. As another example, the user may use pinching and/or stretching gestures on a touchscreen to adjust the height and/or width of the rectangular grid elements.

A grid position may be selected (block 750). The user may move the grid elements to adjust the position of the grid elements with respect to the displayed camera field of view 110. As an example, the user may use a selection element on a user interface to move the grid up or down and/or side to side to align the grid elements with a particular feature displayed in the camera field of view 110. As another example, the user may use a sliding gesture with a finger on a touchscreen to move the grid up or down and/or side to side.

Grid elements may be selected (block 760). For example, the user may touch, or otherwise select, one or more grid elements from selection grid 120 to define motion detection region 130. Multiple motion detection regions 130 may be selected by the user. In some implementations, motion detection region 130 may be selected automatically, without requiring user selection, based on one or more criteria. Motion detection region 130 may be selected based on one or more of a detected object in camera field of view 110, a history of detected motion in a particular area of camera field of view 110, an area of focus in camera field of view 110, and/or based on another criterion.

For example, camera application 501 may perform an object detection algorithm on images in the video feed of camera 210, may manipulate selection grid 120 to align the grid elements with the detected object, and may select grid elements that cover the detected object. As another example, if motion detection system 250 has previously detected movement in a particular area of the camera field of view 110 a particular number of times over a particular time period, motion detection system 250 may provide information relating to the detected movement in the particular area to camera application 501. In response, camera application 501 may select grid elements corresponding to the particular area to define motion detection region 130. As yet another example, camera application 501 may determine an area of focus for camera 210, may manipulate selection grid 120 to align the grid elements with the determined area of focus, and may select grid elements that cover the determined area of focus.

Motion detection may be configured for a video feed from the camera based on the selected grid elements (block 770). In some implementations, setup device 220 may provide information identifying the selected grid elements to motion detection system 250, along with information identifying the user and/or camera 210. The selected grid elements may be identified based on a particular coordinate system, based on ranges of pixels covered by the selected grid elements, and/or using another technique. In other implementations, setup device 220 may provide the information identifying the selected grid elements to camera 210 and camera 210 may provide the information identifying the selected grid elements to motion detection system 250 along with the video feed from camera 210.

Notifications for motion detection may be configured (block 780). For example, the user may select how to receive notifications about motion detection events detected by motion detection system 250 for the video feed from camera 210. The user may select a particular device for receiving the notifications and/or may select a particular account for receiving the notifications. For example, the user may select notification device 230, may select to receive a Short Message Service (SMS) text message to a phone number associated with notification device 230, may select an email address that may be accessed via notification device 230, and/or may select another notification device and/or method.

The user may also configure motion detection system 250, via setup device 220, to provide different types of notifications based on different types of motion events, the time of day, day of the week, whether the user has selected to actively monitor the home (e.g., during a vacation, etc.), the number of detected motion events, and/or based on another criterion. For example, multiple motion detection events when the user is not at home (e.g., based on location information provided to motion detection system 250 from notification device 230) may trigger a heightened alert, such as a telephone call to notification device 230, as opposed to an SMS message.

Figure 8:
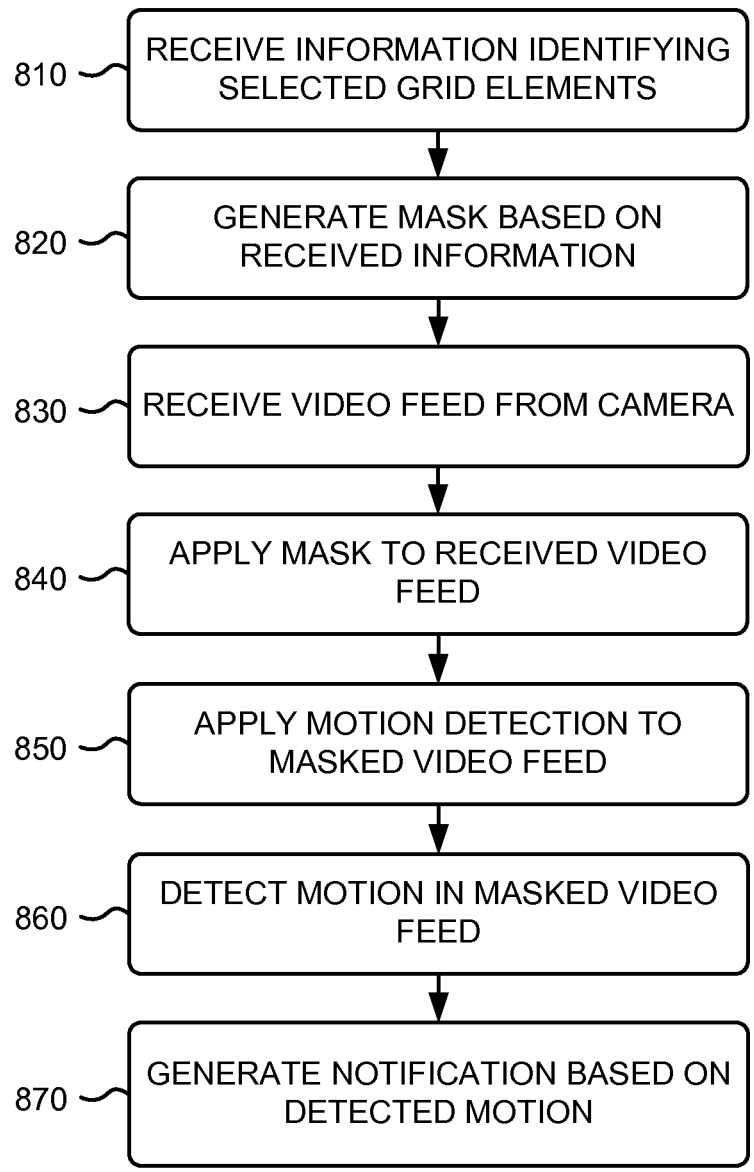
FIG. 8 is a flowchart of a process for detecting motion in a camera video feed according to an implementation described herein.

FIG. 8 is a flowchart of a process for detecting motion in a camera video feed according to an implementation described herein. In some implementations, the process of FIG. 8 may be performed by motion detection system 250. In other implementations, some or all of the process of FIG. 8 may be performed by another device or a group of devices separate from or including motion detection system 250.

The process of FIG. 8 may include receiving information identifying selected grid elements (block 810). For example, motion detection system 250 may receive information identifying grid elements of a selection grid, which were selected to identify motion detection region 130, from setup device 220 and/or from camera 210 and may store the received information in user DB 640. A mask may be generated based on the received information (block 820). Mask generator 635 may use the received information to generate a mask to apply to a received video feed to determine which areas in a field of view of the video feed should be processed for motion detection.

A video feed may be received from the camera (block 830), the mask may be applied to the received video feed (block 840), and motion detection may be applied to the masked video feed (block 850). For example, camera 210 may be configured to stream a video feed to motion detection system 250. Motion detection system 250 may receive the video feed from camera 210, may apply the generated mask to the received video feed, and may apply a motion detection algorithm to the masked video feed. For example, motion detection system 250 may generate a reference image based on the masked video feed and may compare images included in a masked video feed to the reference image to determine how many pixels differ from a particular image in the received video feed to the reference image. The reference image may correspond to an image previously received via the video feed. If the number of pixels between a current masked image in the video feed and the reference image is greater than a threshold, a motion detection event may be generated. The comparison of the reference image to a current image may take into account variations in lights, camera flicker, sensor artifacts, environmental effects, ambient movement, and/or other factors in order to reduce the number of false positive motion detection events. In other implementations, other motion detection techniques may be used.

Motion may be detected in the masked video feed (block 860) and a notification may be generated based on the detected motion (block 870). For example, motion detection system 250 may detect motion in the masked video feed and may access user DB 640 to determine what type of notification to send and to what device and/or address the notification should be sent. As an example, motion detection system 250 may send a Multimedia Message Service (MMS) message to a telephone number, associated with notification device 230, stored in user DB 640. The MMS message may include a snapshot image from the video feed. If the user clicks on the snapshot image, a video that includes the detected motion event may be accessed at motion detection system 250 and played on notification device 230. The video may include, for example, a particular period of time before and after the detected event (e.g., 5 seconds before and after the detected motion event, 10 seconds before and after the detected motion event, etc.). As another example, the user may receive an email that includes a video file with the detected motion event. As yet another example, notification device 230 may include a notification application and motion detection system 250 may send the notification to the notification application (e.g., using an IP address associated with notification device 230). The user may access and view a video that includes the detected motion event by activating the notification application.

Furthermore, if the detected motion event is determined to be of a higher importance, the user may receive a heightened notification, such as a telephone call with a recorded message.

Figure 9A:
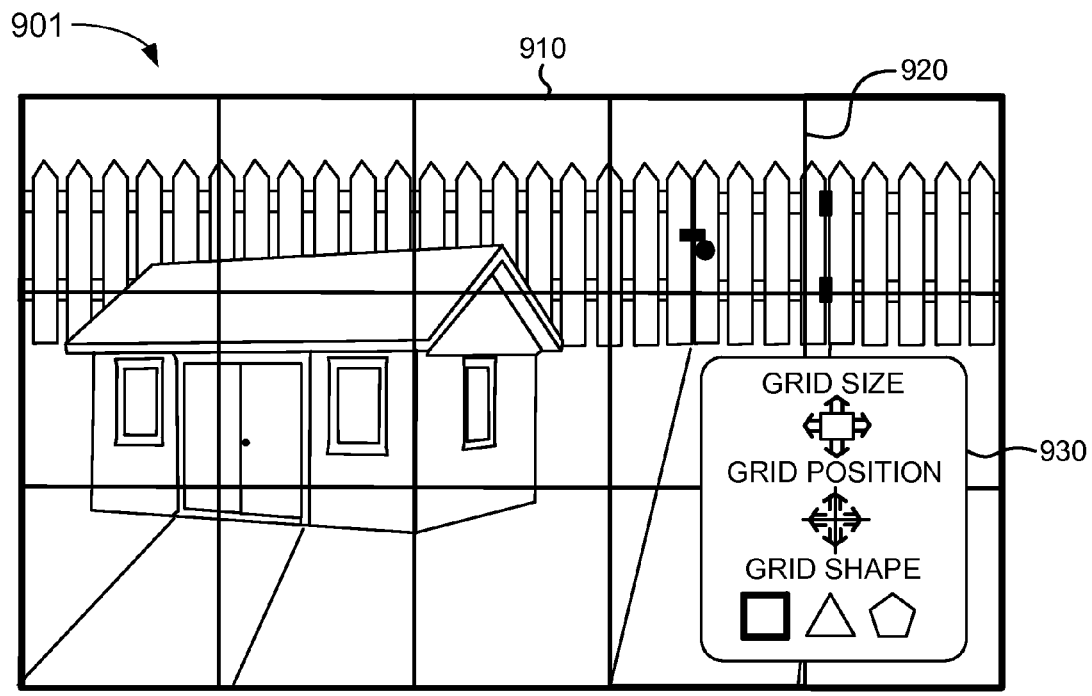
FIGS. 9A-9D are diagrams of an exemplary camera configuration scenario according to an implementation described herein.

FIGS. 9A-9D are diagrams of an exemplary camera configuration scenario according to an implementation described herein. As shown in FIG. 9A, a scenario 901 may include a camera view 910 being displayed on a touchscreen of setup device 220. Camera view 910 may include a view of a garden with a fence and a shed. Setup device 220 may generate selection grid 920 superimposed on top of camera view 910. Furthermore, setup device 220 may generate a selection grid user interface 930. Selection grid user interface 930 may enable the user to select a size for the grid elements of selection grid 920, to select a position for the grid elements of selection grid 920, and/or to select a shape for the grid elements of selection grid 920.

Figure 9B:
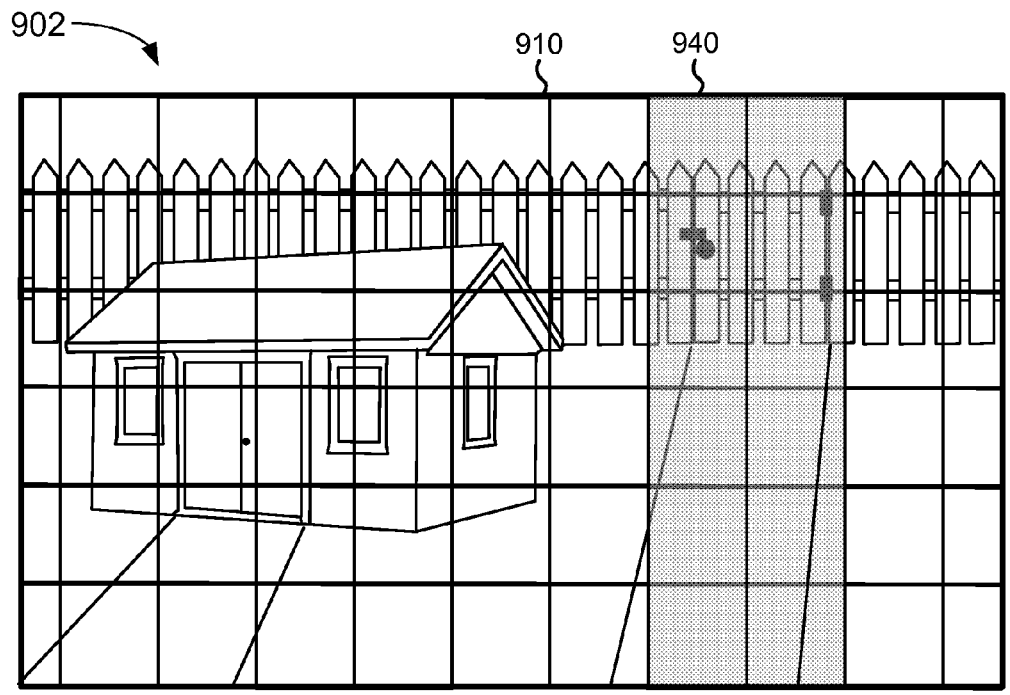

FIG. 9B shows a scenario 902 that includes camera view 910 after the user has changed the size of selection grid 920 to a smaller grid size and after the user has adjusted the position of selection grid 920. Furthermore, scenario 902 includes a first motion detection area 940 selected by the user by touching individual selection grid elements in order to cover the area of camera view 910 that includes the garden gate and the path to the garden gate.

Figure 9C:
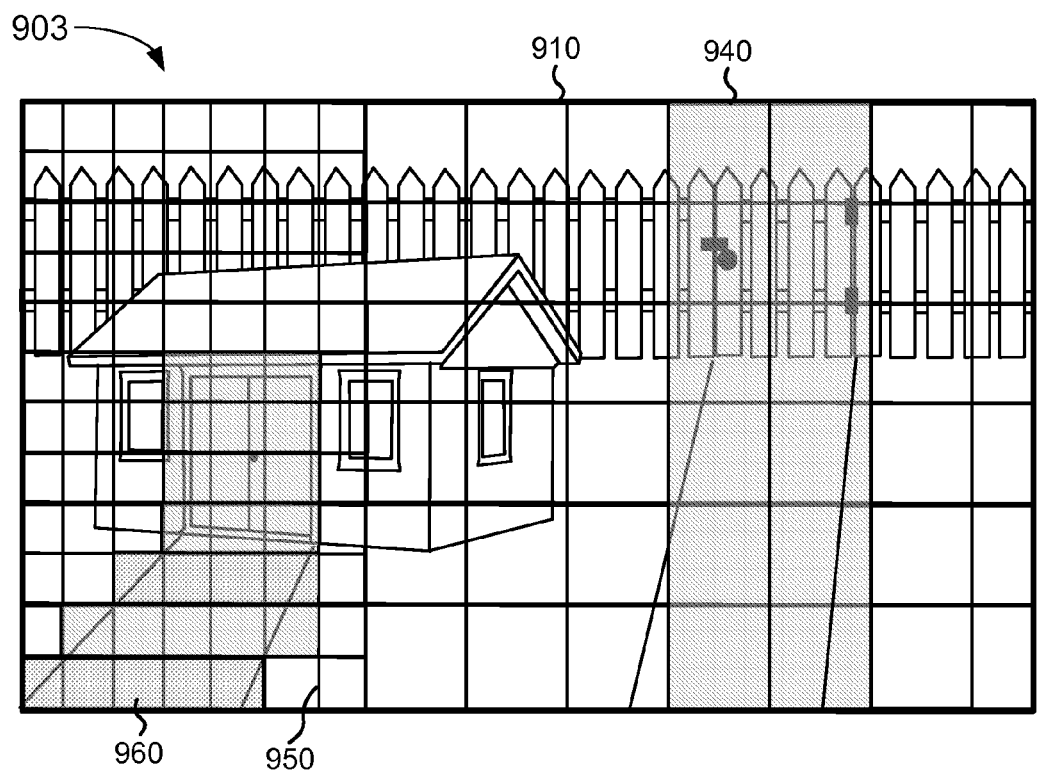

FIG. 9C shows a scenario 903 that includes camera view 910 after the user has selected to change the size of selection grid 920 in the left part of camera view 910. The user may, for example, select part of the screen (e.g., by tracing an outline around the selected part of the screen) and may activate selection grid user interface 930 by pressing a selection button on setup device 220, by performing a particular gesture on the touchscreen of setup device 220, and/or using another technique. The user may then select to change the size, position, and/or shape of the selection elements in the selected part of the screen to second selection grid 950 which includes grid elements of a smaller size than selection grid 920. The user may then select a second motion detection area 960 in order to cover the area of camera view 910 that includes a shed door and a path to the shed door.

Figure 9D:

FIG. 9D illustrates a mask 904 that may be generated by motion detection system 250 based on first motion detection area 940 and second motion detection area 960. Thus, when a video feed of camera view 910 from camera 210 is received by motion detection system 250, motion detection system 250 may perform a motion detection process on the areas of camera view 910 corresponding to mask 904.

Figure 10:
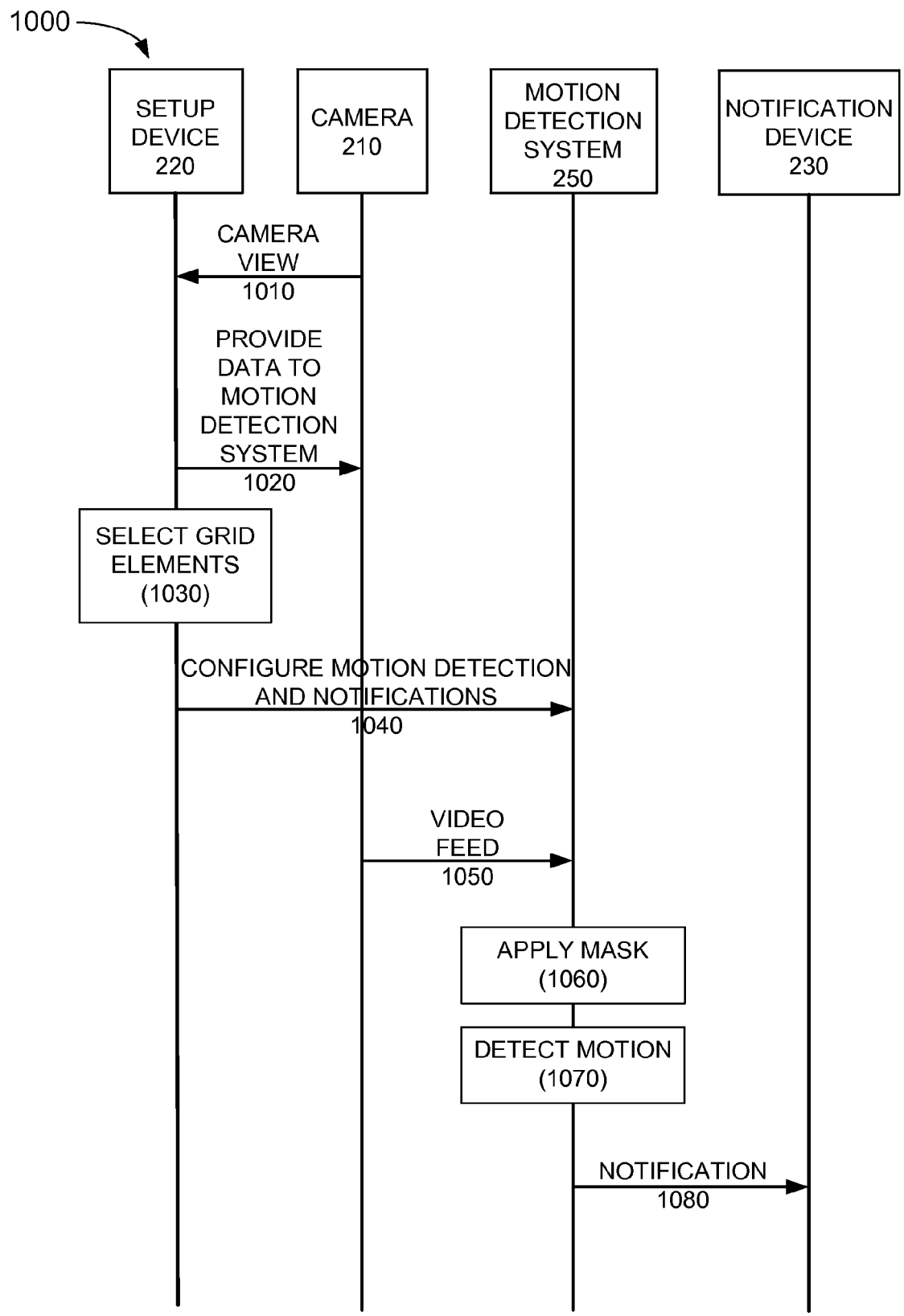
FIG. 10 is a diagram of an exemplary signal flow scenario according to an implementation described herein.

FIG. 10 is a diagram of an exemplary signal flow scenario 1000 according to an implementation described herein. As shown in FIG. 10, signal flow scenario 1000 may include setup device 220 obtaining a camera view feed from camera 210 (signal 1010). The user may use setup device 220 to instruct camera 210 to provide a streaming video feed to motion detection system 250 (signal 1020). The user may then use selection grid 120 to select one or more grid elements to define motion detection region 130 (block 1030) and setup device 220 may provide the information identifying the selected grid elements to motion detection system 250 as well as information identifying where notifications about detected motion events should be sent and the type of notification that should be sent (signal 1040).

Motion detection system 250 may receive a video feed from camera 210 (signal 1050). Motion detection system 250 may apply a mask to the received video feed (block 1060) and may detect motion in the masked video feed (block 1070). In response to detecting motion in the masked video feed, motion detection system 250 may send a notification to notification device 230 (signal 1080).

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

As an example, while series of blocks have been described with respect to FIGS. 7 and 8, and series of signal flows have been described with respect to FIG. 10, the order of the blocks and/or signal flows may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/ "comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method, performed by a computer device, the method comprising:
   receiving, by the computer device, a request to set up motion detection for a camera;
   generating, by the computer device, a selection grid for a field of view associated with the camera, wherein the selection grid includes a plurality of grid elements;
   providing, by the computer device, a graphical user interface superimposed over the field of view and configured to enable a user to manipulate the selection grid to select at least one of a size of grid elements in the plurality of grid elements, a shape of the grid elements in the plurality of grid elements, or a position of the selection grid;
   receiving, by the computer device, a selection of at least one of the size of the grid elements, the shape of the grid elements, or the position of the selection grid via the graphical user interface;
   selecting, by the computer device, one or more grid elements of the plurality of grid elements; and
   configuring, by the computer device, motion detection for a video feed from the camera based on the selected one or more grid elements.

2. The method of claim 1, wherein receiving the selection of at least one of the size of the grid elements, the shape of the grid elements, or the position of the selection grid via the graphical user interface comprises:
   receiving a selection of the size of the grid elements.

3. The method of claim 1, wherein receiving the selection of at least one of the size of the grid elements, the shape of the grid elements, or the position of the selection grid via the graphical user interface comprises:
   receiving a selection of the position of the selection grid.

4. The method of claim 1, wherein receiving the selection of at least one of the size of the grid elements, the shape of the grid elements, or the position of the selection grid via the graphical user interface comprises:
   receiving a selection of the shape of the grid elements.

5. The method of claim 1, wherein receiving the selection of at least one of the size of the grid elements, the shape of the grid elements, or the position of the selection grid via the graphical user interface comprises:
   receiving a selection of a first size or shape for a first subset of grid elements in the plurality of grid elements; and
   receiving a selection of a second size or shape for a second subset of grid elements in the plurality of grid elements.

6. The method of claim 1, further comprising:
   adjusting the selection grid based on the received selection of at least one of the size of the grid elements, the shape of the grid elements, or the position of the selection grid.

7. The method of claim 1, wherein selecting the one or more grid elements of the plurality of grid elements includes:

selecting the one or more grid elements based on at least one of a detected object in the field of view, a history of detected motion in the field of view, or an area of focus in the field of view.

8. The method of claim 1, wherein configuring motion detection for the video feed from the camera based on the selected one or more grid elements includes:
configuring the camera to provide information identifying the selected one or more grid elements to a motion detection system along with the video feed.

9. The method of claim 1, wherein configuring motion detection for the video feed from the camera based on the selected one or more grid elements includes:
providing information identifying the selected one or more grid elements to a motion detection system, wherein the motion detection system is configured to receive the video feed from the camera and perform motion detection on the video feed.

10. A computer device comprising:
a memory storing instructions; and
a processor configured to execute the instructions to:
receive a request to set up motion detection for a camera;
generate a selection grid for a field of view associated with the camera, wherein the selection grid includes a plurality of grid elements;
provide a graphical user interface superimposed over the field of view and configured to enable a user to manipulate the selection grid to select at least one of a size of grid elements in the plurality of grid elements, a shape of the grid elements in the plurality of grid elements, or a position of the selection grid;
receive a selection of at least one of the size of the grid elements, the shape of the grid elements, or the position of the selection grid via the graphical user interface;
select one or more grid elements of the plurality of grid elements; and
configure motion detection for a video feed from the camera based on the selected one or more grid elements.

11. The computer device of claim 10, wherein, when receiving the selection of at least one of the size of the grid elements, the shape of the grid elements, or the position of the selection grid via the graphical user interface, the processor is further configured to:
select the size of the grid elements.

12. The computer device of claim 10, wherein, when receiving the selection of at least one of the size of the grid elements, the shape of the grid elements, or the position of the selection grid via the graphical user interface, the processor is further configured to:
select the position of the selection grid.

13. The computer device of claim 10, wherein, when receiving the selection of at least one of the size of the grid elements, the shape of the grid elements, or the position of the selection grid via the graphical user interface, the processor is further configured to:
select the shape of the grid elements.

14. The computer device of claim 10, wherein, when receiving the selection of at least one of the size of the grid elements, the shape of the grid elements, or the position of the selection grid via the graphical user interface, the processor is further configured to:
receive a selection of a first size or shape for a first subset of grid elements in the plurality of grid elements; and
receive a selection of a second size or shape for a second subset of grid elements in the plurality of grid elements.

15. The computer device of claim 10, wherein the processor is further configured to:
adjust the selection grid based on the received selection of at least one of the size of the grid elements, the shape of the grid elements, or the position of the selection grid.

16. The computer device of claim 10, wherein, when selecting the one or more grid elements of the plurality of grid elements, the processor is further configured to:
select the one or more grid elements based on at least one of a detected object in the field of view, a history of detected motion in the field of view, or an area of focus in the field of view.

17. The computer device of claim 10, wherein, when configuring motion detection for the video feed from the camera based on the selected one or more grid elements, the processor is further configured to:
configure the camera to provide information identifying the selected one or more grid elements to a motion detection system along with the video feed.

18. The computer device of claim 10, wherein, when configuring motion detection for the video feed from the camera based on the selected one or more grid elements, the processor is further configured to:
provide information identifying the selected one or more grid elements to a motion detection system, wherein the motion detection system is configured to receive the video feed from the camera and perform motion detection on the video feed.

19. A method, performed by a computer device, the method comprising:
providing, by the computer device, a graphical user interface superimposed over the field of view and configured to enable a user to manipulate the selection grid to select at least one of a size of grid elements in the plurality of grid elements, a shape of the grid elements in the plurality of grid elements, or a position of the selection grid;
receiving, by the computer device, a selection of at least one of the size of the grid elements, the shape of the grid elements, or the position of the selection grid via the graphical user interface;
receiving, by the computer device, information identifying one or more selected grid elements for the selection grid associated with the field of view for the camera;
generating, by the computer device, a mask based on the information identifying the one or more selected grid elements;
receiving, by the computer device, a video feed from the camera;
applying, by the computer device, the generated mask to the received video feed to select one or more areas in the video feed to which to apply motion detection;
detecting, by the computer device, motion in the masked video feed; and
sending, by the computer device, a notification to a notification device associated with the camera, in response to detecting the motion in the masked video feed.

20. The method of claim 19, wherein the information identifying the one or more selected grid elements is received from the notification device.

* * * * *